United States Patent
Kim

(10) Patent No.: US 7,627,049 B2
(45) Date of Patent: Dec. 1, 2009

(54) SAMPLING FREQUENCY OFFSET TRACKING METHOD AND OFDM SYSTEM USING THE SAME

(75) Inventor: Yun-young Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 721 days.

(21) Appl. No.: 11/445,255

(22) Filed: Jun. 2, 2006

(65) Prior Publication Data

US 2007/0041312 A1    Feb. 22, 2007

(30) Foreign Application Priority Data

Aug. 22, 2005   (KR) .................. 10-2005-0076892

(51) Int. Cl.
    *H04K 1/10* (2006.01)

(52) U.S. Cl. ..................................... 375/260

(58) Field of Classification Search ............. 375/134, 375/137, 145, 147, 149, 260, 262, 355; 370/208, 370/210
    See application file for complete search history.

(56) References Cited

U.S. PATENT DOCUMENTS

| | | | |
|---|---|---|---|
| 2002/0145971 A1* | 10/2002 | Cho et al. | 370/208 |
| 2004/0125742 A1* | 7/2004 | Schmidt | 370/208 |
| 2004/0141457 A1* | 7/2004 | Seo et al. | 370/203 |
| 2004/0184551 A1* | 9/2004 | Liu et al. | 375/260 |
| 2005/0084025 A1* | 4/2005 | Chen | 375/260 |
| 2005/0100106 A1* | 5/2005 | Chen | 375/260 |

* cited by examiner

*Primary Examiner*—Young T. Tse
(74) *Attorney, Agent, or Firm*—Sughrue Mion, PLLC

(57) ABSTRACT

A sampling frequency offset tracking method in an orthogonal frequency division multiplexing (OFDM) system includes determining a search direction of maximum likelihood estimation (MLE) using a carrier frequency offset estimated using pilot subcarriers of a received signal; calculating a size of a MLE search region using a maximum sampling frequency offset of the OFDM system and a resolution of the MLE; calculating a range of the MLE search region for each OFDM symbol based on the size of the MLE search region; and tracking the sampling frequency offset by calculating a maximum correlation between the pilot subcarriers and reference pilot subcarriers within the MLE search region each OFDM symbol. Accordingly, the search region of the MLE is reduced according to the sign of the estimated carrier frequency offset. Therefore, the sampling frequency offset can be easily tracked and the estimation error can be reduced.

15 Claims, 7 Drawing Sheets

SAMPLING FREQUENCY OFFSET TRACKING METHOD AND OFDM SYSTEM USING THE SAME

CROSS-REFERENCE TO RELATED APPLICATIONS

This application claims priority from Korean Patent Application No. 10-2005-0076892 filed on Aug. 22, 2005 in the Korean Intellectual Property Office, the entire disclosure of which is incorporated herein by reference.

BACKGROUND OF THE INVENTION

1. Field of the Invention

Methods and systems consistent with the present invention relate to sampling frequency offset tracking and orthogonal frequency division multiplexing (OFDM) systems applied thereto, and more particularly, to a sampling frequency offset tracking method for reducing an estimation search region when a sampling frequency offset is tracked using maximum likelihood estimation (MLE), and an OFDM system which employs the sampling frequency offset tracking method.

2. Description of the Related Art

An OFDM technique splits a broadband transmission to a plurality of narrowband parallel transmissions by converting an incoming serial data sequence to parallel data of a certain block unit and multiplexing the parallel symbols to different orthogonal carrier frequencies. The OFDM technique is robust to multipath fading in a wireless communication environment, and allows data transmission at a high rate.

In an OFDM system, a sampling frequency offset tracking mostly takes advantage of pilot subcarriers. In the scheme using the pilot subcarriers, a receiving end performs synchronization using data which is known to both of a transmitting end and the receiving end and called pilot symbols. Oscillators are employed to configure a digital-to-analog converter (DAC) or an analog-to-digital converter (ADC) which is used for the signal conversion at the OFDM transmitting end and receiving end. The oscillators of the transmitting end and the receiving end do not have exactly the same period.

Such a sampling frequency offset rotates subcarriers, and this causes the inconsistence of a sampling instance. As a result, intercarrier interference (ICI) and signal to noise ratio (SNR) loss occur and thus the orthogonality of the subcarrier is destroyed.

FIGS. 1A and 1B are diagrams for illustrating effects of a sampling frequency offset in a time domain. Specifically, FIG. 1A demonstrates a positive sampling frequency offset, and FIG. 1B demonstrates a negative sampling frequency offset.

Referring first to FIG. 1A, when a sampling time at the transmitting end is faster than a sampling time at the receiving end, the sampling time difference between the transmitting end and the receiving end increases as time goes by. After a certain time period, one sample at the receiving end is left over in comparison with the number of samples at the transmitting end, and thus 1-sample robbing is required.

Referring to FIG. 1B, when the sampling time at the transmitting end is later than the sampling time at the receiving end, the sampling time difference between the transmitting end and the receiving end increases as time goes by similarly to the case as shown in FIG. 1A. After a certain time period, the number of the samples at the receiving end is greater than the number of samples at the transmitting end, and thus 1-sample stuffing is required.

FIG. 2 is a graph for illustrating effects of a sampling frequency offset in a time domain.

Referring to FIG. 2, the subcarrier index has a linear relation with the phase difference of the sampling frequency offset in the time domain. Since the sampling frequency offset varies the timing offset for each OFDM symbol, the degree of the phase rotation differs in the frequency domain. As shown in FIG. 2, as the OFDM symbol index increases, the amount of the phase change also increases.

Accordingly, it is necessary to compensate the difference of the number of samples due to the frequency offset by accurately tracking the sampling frequency offset, compensating the phase change due to the frequency offset in the frequency domain, and robbing or stuffing a sample in the time domain.

Amongst conventional sampling frequency offset tracking methods, a maximum likelihood estimation (MLE) method tracks the sampling frequency offset by calculating correlations between pilot signals which are predefined according to a resolution, and received pilot signals and detecting a pilot signal having a maximum correlation. At this time, the MLE can be expressed as below.

[Equation 1]

$$\Delta \hat{t}_m = \max_t \left\{ \left| \sum_{k=0}^{N_p-1} Y_{m,k} [X_k e^{j2\pi kt/n}]^* \right|^2 \right\}$$

In Equation 1, $\Delta t$ is a sampling frequency offset, $Y_{m,k}$ is a k-th pilot subcarrier of a m-th OFDM symbol, and $X_k$ is a k-th reference pilot subcarrier. t denotes a sampling timing offset, and M denotes a resolution of the sampling timing offset. $t \in [-1, -1/M, \ldots, 0, \ldots, 1/M, \ldots, 1]$, and t is $(2M+1)$ in total.

Performance and complexity of the sampling frequency offset track using the MLE depend on a sampling resolution M which indicates the sampling timing offset. For instance, if a resolution is 16, it is possible to split up to time errors corresponding to $1/16 = 0.0625$ of the sampling time.

However, according to the conventional MLE, in case that the number of symbols N is 128, the number of pilot subcarriers $N_p$ is 12, and the resolution of the sampling timing offset M is 16, the number of complex multiplications is $(2M+1) N_P = 396$ in accordance with Equation 1. Thus, the sampling frequency offset tracking becomes complicated.

According to ultra wide band (UWB) multiband OFDM Alliance (MBOA), one OFDM symbol consists of 165 samples with respect to a sampling frequency at 528 MHz. In this situation, when a single complex multiplier is employed, $396/165 = 2.4$ OFDM symbol time is required. Thus, when the offset tracking is required for every OFDM symbol, the tracking method using only one complex multiplier is not applicable. In case that three complex multipliers are utilized in parallel, 0.77 OFDM symbol time is required and thus the estimation is feasible for every OFDM symbol. However, when a plurality of complex multipliers is used, the complexity and the power consumption of the OFDM receiver drastically increase.

SUMMARY OF THE INVENTION

The present invention provides a method for accurately and easily tracking a sampling frequency offset by reducing an estimation search region by use of maximum likelihood estimation (MLE), and an orthogonal frequency division multiplexing (OFDM) system to which the method is applied.

According to an aspect of the present invention, there is provided an OFDM system for tracking a sampling frequency offset using MLE, including an oscillator which generates a carrier frequency and a sampling frequency; a converter which samples a received signal with the generated sampling frequency; a frequency offset estimator which estimates a carrier frequency offset using at least one pilot subcarrier of the received signal; a fast Fourier transformer (FFT) which transforms the sampled received signal into a frequency domain; and an offset tracker which tracks the sampling frequency offset by calculating at least one of a range and a size of an MLE search region for each OFDM symbol based on a sign of the estimated carrier frequency offset, a maximum sampling frequency offset of the OFDM system, and a resolution of the MLE, and performs the MLE within the range of the MLE search region which is calculated for each OFDM symbol.

The offset tracker may include a determiner which determines a search direction of the MLE according to the sign of the estimated carrier frequency offset; a calculator which calculates the size of the MLE search region using the maximum sampling frequency offset of the OFDM system and the resolution of the MLE, and calculates the MLE search region for each OFDM symbol based on the calculated size; and a detector which detects the sampling frequency offset by calculating a maximum correlation between the at least one pilot subcarrier of the received signal and at least one predefined reference pilot subcarrier within the MLE search region calculated for each OFDM symbol.

The range of the MLE search region for each OFDM symbol may have a start point which is an end point of an MLE search region of a previous OFDM symbol, and an end point which is a value obtained by adding the calculated size of the MLE search region to the start point.

The OFDM system may further include a phase compensator which compensates a phase which is changed due to the tracked sampling frequency offset, and a rob and stuff section which robs or stuffs one sample from or to a location shifted by one sample which is detected based on the tracked sampling frequency offset.

According to another aspect of the present invention, there is provided a sampling frequency offset tracking method in an orthogonal frequency division multiplexing (OFDM) system which tracks a sampling frequency offset using maximum likelihood estimation (MLE), including determining a search direction of the MLE using a carrier frequency offset which is estimated using at least one pilot subcarrier of a received signal; calculating a size of an MLE search region using a maximum sampling frequency offset of the OFDM system and a resolution of the MLE; calculating a range of the MLE search region for each OFDM symbol based on the calculated size of the MLE search region; and tracking the sampling frequency offset by calculating a maximum correlation between the at least one pilot subcarrier of the received signal and at least one predefined reference pilot subcarrier within the MLE search region calculated for each OFDM symbol.

The size of the MLE search region may be calculated based on the following equation:

$$K = \left(\left[\frac{1}{M}\frac{f_s + \Delta f_s}{N_s \Delta f_s}\right]^{-1}\right) + A$$

where K denotes the size of She MLE search region, $\Delta f_s$ denotes the maximum sampling frequency offset of the OFDM system, $N_s$ denotes a size of each OFDM symbol size, M denotes the resolution of the MLE, $f_s$ denotes the generated sampling frequency, and A denotes a predetermined constant.

The range of the MLE search region for each OFDM symbol may have a start point which is an end point of an MLE search region of a previous OFDM symbol, and an end point which is a value obtained by adding the calculated size of the MLE search region to the start point.

BRIEF DESCRIPTION OF THE DRAWING FIGURES

The above and/or other aspects of the invention will become apparent and more readily appreciated from the following description of exemplary embodiments, taken in conjunction with the accompanying drawing figures of which:

DETAILED DESCRIPTION OF THE EXEMPLARY EMBODIMENTS

Figure 1A:
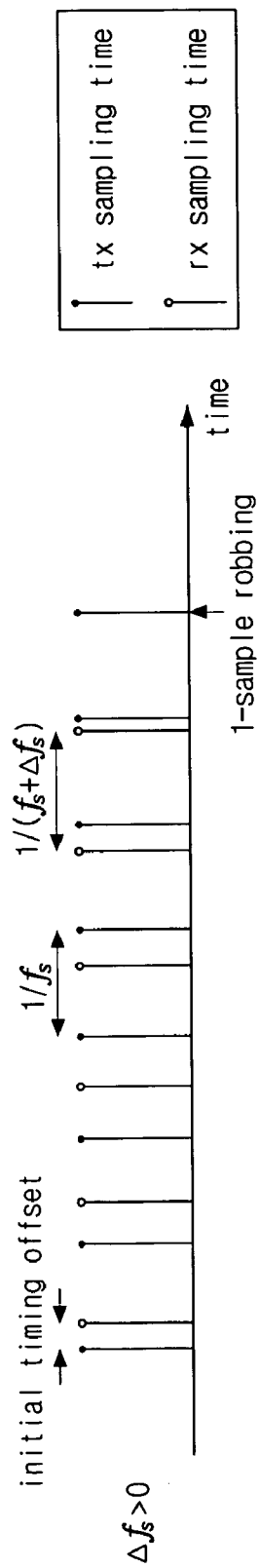
FIGS. 1A and 1B illustrate effects of a sampling frequency offset in a time domain.
Figure 1B:
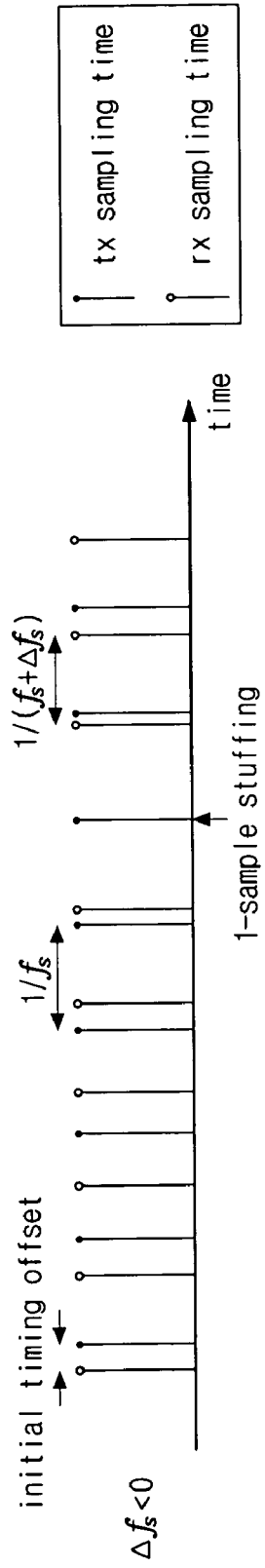
Figure 2:
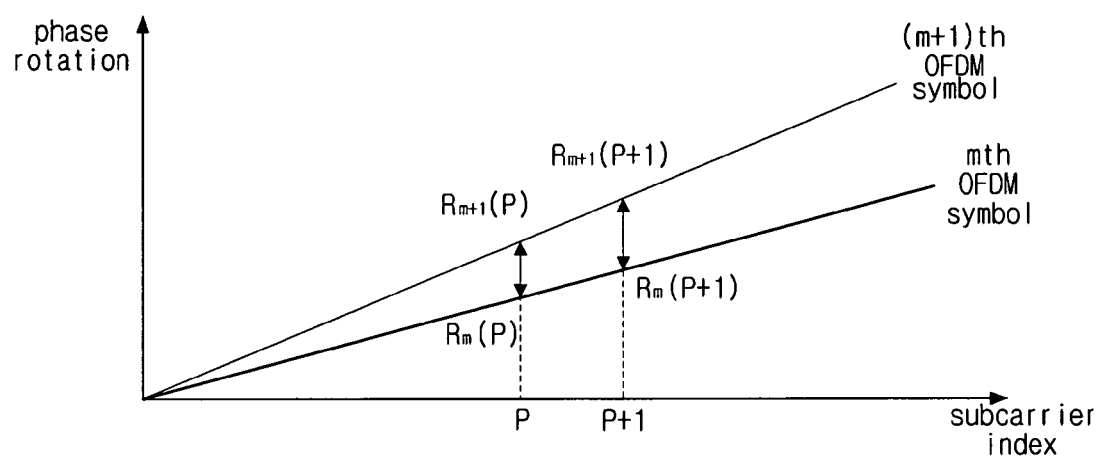
FIG. 2 illustrates effects of a sampling frequency offset in a frequency domain.

Certain exemplary embodiments of the present invention will now be described in greater detail with reference to the accompanying drawings.

In the following description, same drawing reference numerals are used for the same elements even in different drawings. The matters defined in the description, such as detailed construction and element descriptions, are provided to assist in a comprehensive understanding of the invention. Also, well-known functions or constructions are not described in detail since they would obscure the invention in unnecessary detail.

Figure 3:
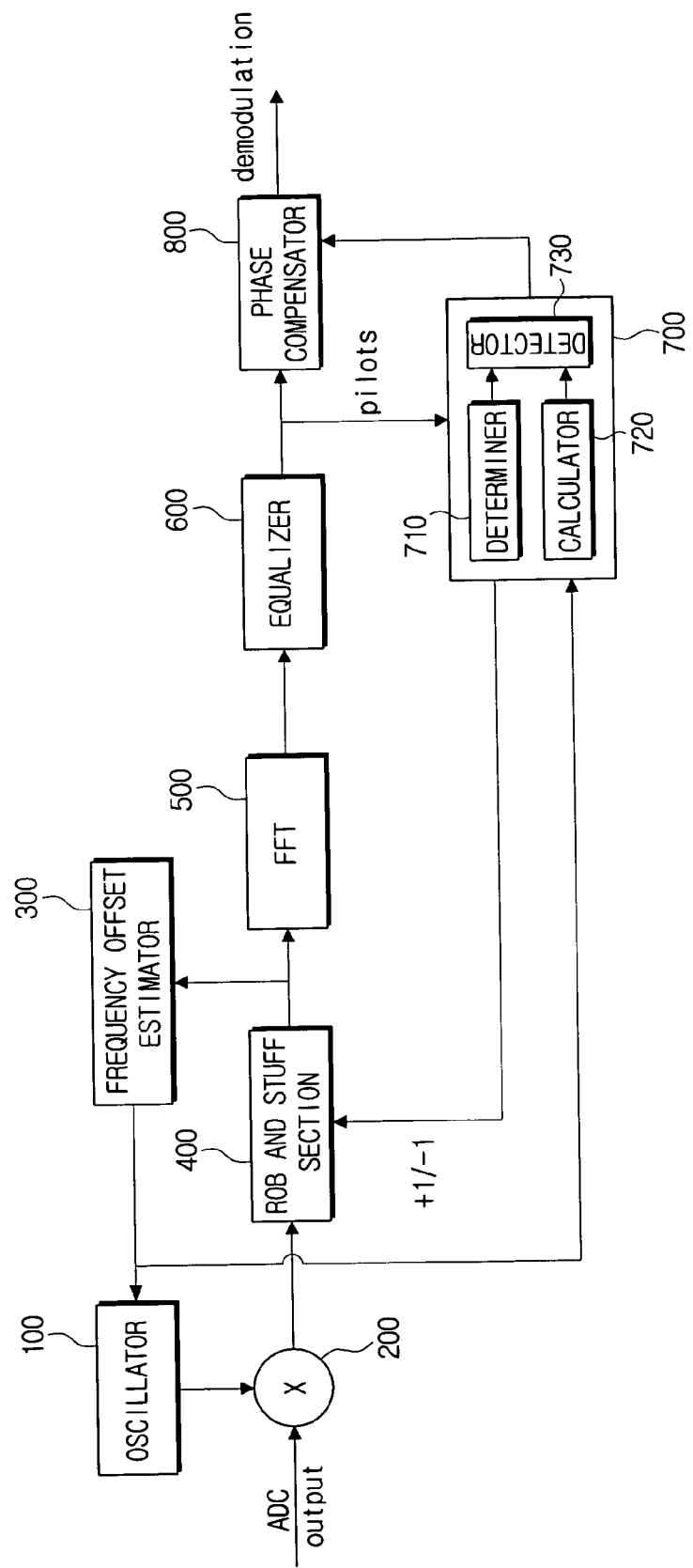
FIG. 3 illustrates an OFDM system according to an exemplary embodiment of the present invention.

FIG. 3 is a block diagram of an OFDM system according to an exemplary embodiment of the present invention.

Referring to FIG. 3, the OFDM system includes an oscillator 100, a multiplier 200, a frequency offset estimator 300, a rob and stuff section 400, a fast Fourier transformer (FFT) 500, an equalizer 600, an offset tracker 700, and a phase compensator 800.

The oscillator 100 generates a uniform carrier frequency and a uniform sampling frequency.

The multiplier 200 samples an output of an analog-to-digital converter (ADC) which is not shown, with the uniform sampling frequency generated by the oscillator 100.

The frequency offset estimator 300 estimates an offset of the carrier frequency. The FFT 500 transforms the sampled received signal into a frequency domain.

The equalizer 600 removes multipath due to a channel environment from the received signal based on the channels estimated using pilot subcarriers.

The offset tracker 700 includes a determiner 710, a calculator 720, and a detector 730. The offset tracker 700 tracks a sampling frequency offset by calculating correlations between reference pilot signals which are predefined according to a resolution of maximum likelihood estimation (MLE), and the received pilot signals and detecting a pilot signal having a maximum correlation.

In further detail, the determiner 710 determines an MLE direction according to a sign of the carrier frequency offset which is estimated at the frequency offset estimator 300. If the carrier frequency and the sampling frequency are generated by the same oscillator 100, the oscillator error is the same. Hence, if the estimated carrier frequency offset is positive, this implies that the sampling time of a receiver is later than the sampling time of a transmitter. If the estimated carrier frequency offset is negative, this implies that the sampling time of the receiver is faster than that of the transmitter.

As for the positive sampling frequency offset, the determiner 710 determines an estimation search direction so as to calculate correlations between the predefined pilot subcarriers and the received pilot subcarriers which are received earlier than the reference pilot subcarriers.

The calculator 720 calculates a size of an MLE search region and the MLE search region for each OFDM symbol, that is, calculates a start point and an end point of the search region. The calculator 720 calculates the size of the MLE search region based on the MLE resolution and a maximum sampling frequency offset which is defined depending on the OFDM system.

Next, the calculator 720 calculates the search region by setting the start point of the search region of the OFDM symbol to zero when initiating the MLE, and setting the end point to a value which is obtained by adding the size of the calculated search region. Afterwards, the start point of the MLE search region of a next OFDM symbol is set to the end point of the search region of the previous OFDM symbol, and the start point of the next OFDM symbol is calculated by adding the size of the search region to the start point. In this manner, the MLE search region of the individual OFDM symbol is calculated.

The detector 730 detects the sampling frequency offset by calculating a maximum correlation between the predefined reference pilot subcarriers and the received pilot subcarriers within the MLE range acquired for each OFDM symbol.

The phase compensator 800 compensates phase distortion in the frequency domain by use of the sampling frequency error which is tracked at the offset tracker 700.

The rob and stuff section 400 robs or stuffs one sample from or into the signal according to the sampling frequency offset which is acquired at the offset tracker 700. When the sampling frequency offset is positive, one sample is robbed. In contrast, when the sampling frequency offset is negative, one sample is stuffed.

The sampling frequency error results in the gradual increase of a sampling instance to be longer than a sampling cycle. Hence, the distortion due to the sampling frequency error is compensated in the time domain by detecting the location of the one sample shift and stuffing or robbing a sample. Accordingly, a start point of a FFT window, which changes as time passes by, is adjusted at the FFT 500.

Figure 4A:
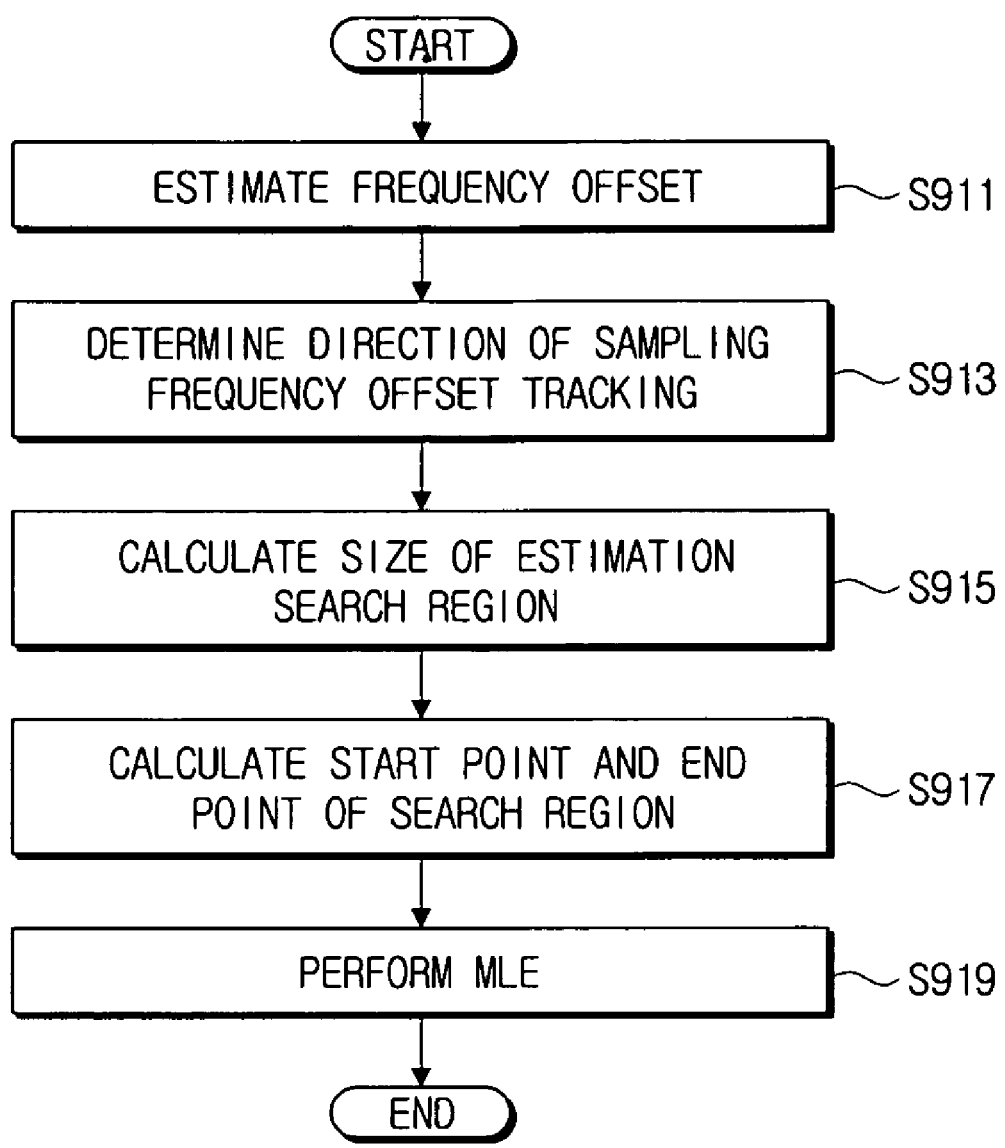
FIGS. 4A and 4B illustrate a sampling frequency offset tracking method according to an exemplary embodiment of the present invention.
Figure 4B:
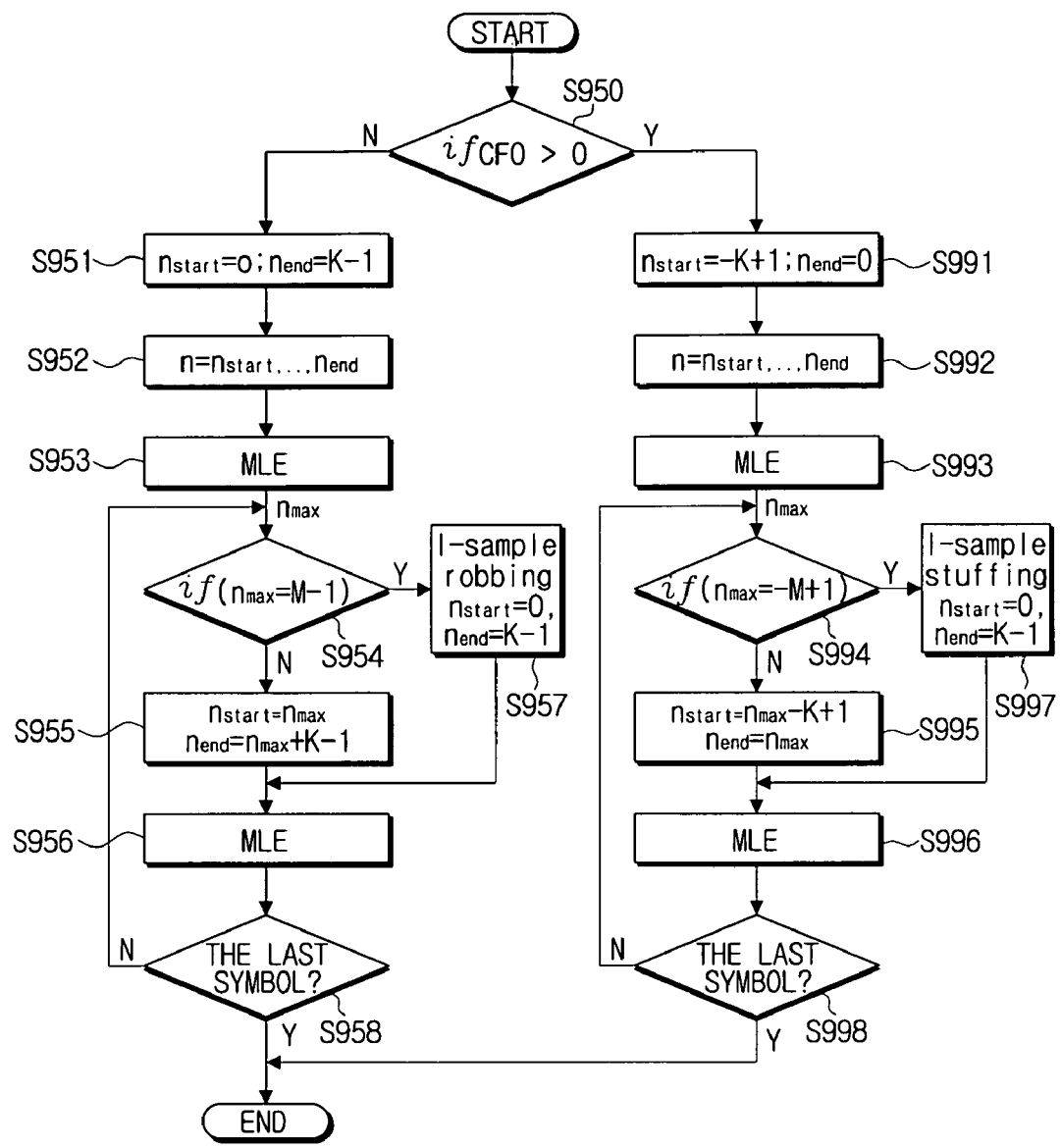

FIGS. 4A and 4B are flowcharts outlining a sampling frequency offset tracking method according to an exemplary embodiment of the present invention.

Referring first to FIG. 4A, a frequency offset is estimated using a received signal and a delayed received signal (S911). In case that the carrier frequency and the sampling frequency are generated by one oscillator, the carrier frequency offset and the sampling frequency offset are detected at the same rate. Hence, the frequency offset is firstly estimated in order to determine the MLE direction for the sake of the sampling frequency offset tracking.

Next, the direction of the sampling frequency offset estimation, to be applied to the MLE, is determined (S913). For instance, provided that the carrier frequency is 3960 MHz and the error is 40 parts per million (ppm), the carrier frequency offset is 3960×40. When the oscillator error is 40 ppm, an error applied to the sampling frequency is also 40 ppm. The positive value of the carrier frequency offset implies that the sampling time of the receiver is later than that of the transmitter.

To track the sampling frequency offset, the MLE is carried out by calculating correlations between the pilot subcarriers of the received signal prior to the predefined reference pilot subcarriers, and the reference pilot subcarrier according to the MLE resolution. Thus, it is not necessary to calculate correlations between the pilot subcarriers of the received signal after the predefined reference pilot subcarriers, and the reference pilot subcarriers. As a result, the calculation overhead in the MLE can be reduced by half.

Next, the size of the MLE search region is calculated using the MLE resolution and the maximum sampling frequency offset which is defined depending on each OFDM system (S915). The consideration calculation overhead is required to calculate the correlations between the reference pilot subcarriers and the received pilot subcarriers within the MLE resolution for each symbol.

The change of the phase in the frequency domain due to the sampling frequency offset increases as time passes by, but the degree of the phase change is restricted because the maximum sampling frequency offset is limited by the system. Accordingly, when the phase change is estimated using the MLE, the estimation search region of the phase change is restricted by each symbol, and thus the calculation overhead of the MLE and the estimation error can be reduced.

The size of the sampling timing index, which may differ for each OFDM symbol, is determined by the sampling frequency offset, the OFDM symbol size, the MLE resolution, and the sampling frequency. The estimation search range according to the symbol index can be expressed as follows.

[Equation 2]

$$K = \text{floor}\left(\left[\frac{1}{M}\frac{f_s + \Delta f_s}{N_s \Delta f_s}\right]^{-1}\right) + 3$$

In Equation 2, K denotes a size of the estimation search region, $\Delta f_s$ denotes a maximum sampling frequency offset of each OFDM system, and $N_s$ denotes an OFDM symbol size. M denotes an MLE resolution, and $f_s$ denotes a sampling frequency.

As can be seen from Equation 2, the size of the sampling timing index, which may vary between the OFDM symbols, is 1 at minimum. Hence, the MLE search should be conducted on at least two sampling timing indexes. In case that noise causes erroneous tracking of the sampling frequency offset, the estimation error affects the OFDM symbols as the OFDM symbol indexes increase. To prevent this, the search is conducted on at least three sampling timing indexes. As a result, the estimation search range is set to a value obtained by adding three to the calculation result of the sampling frequency offset, the OFDM symbol size, the MLE resolution, and the sampling frequency. It is noted that the added value can be adjusted to another value more than two if necessary.

After determining the size of the estimation search region, a start point and an end point of the search region are calculated for each symbol index (S917). Since the start point of the sampling frequency offset tracking is 0 and the size of the estimation search range is K, the search region of the first OFDM symbol is [0, K−1] in the sampling frequency offset tracking. The MLE search region of the second OFDM symbol ranges from the end point of the search region of the first OFDM symbol as the start point of the second OFDM symbol, to a point to which K is added. Search regions for symbols subsequent to the second OFDM symbol are determined in the same manner.

The start point and the end point of the MLE search region of an OFDM symbol can be expressed as follows.

[Equation 3]

$$n_s = (n_{max} - \text{floor}(K/2))\%(M-1)$$

$$n_e = (n_{max} + (K-1))\%(M-1)$$

[Equation 4]

$$n_s = n_{max}\%(M-1)$$

$$n_e = (n_{max} + (K-1))\%(M-1)$$

In Equations 3 and 4, $n_s$ and $n_e$ denote the start point and the end point of the estimation search region, respectively. K denotes the size of the estimation search region, and M denotes the MLE resolution.

As can be seen from Equation 4, the start point of the search region of the OFDM symbol can be the end point of the search region of the previous OFDM symbol. Yet, as expressed in Equation 3, the start point of the search region of the OFDM symbol can be a value obtained by subtracting a certain value from the end point of the search region of the previous OFDM symbol by taking account of probable errors.

Figure 5:
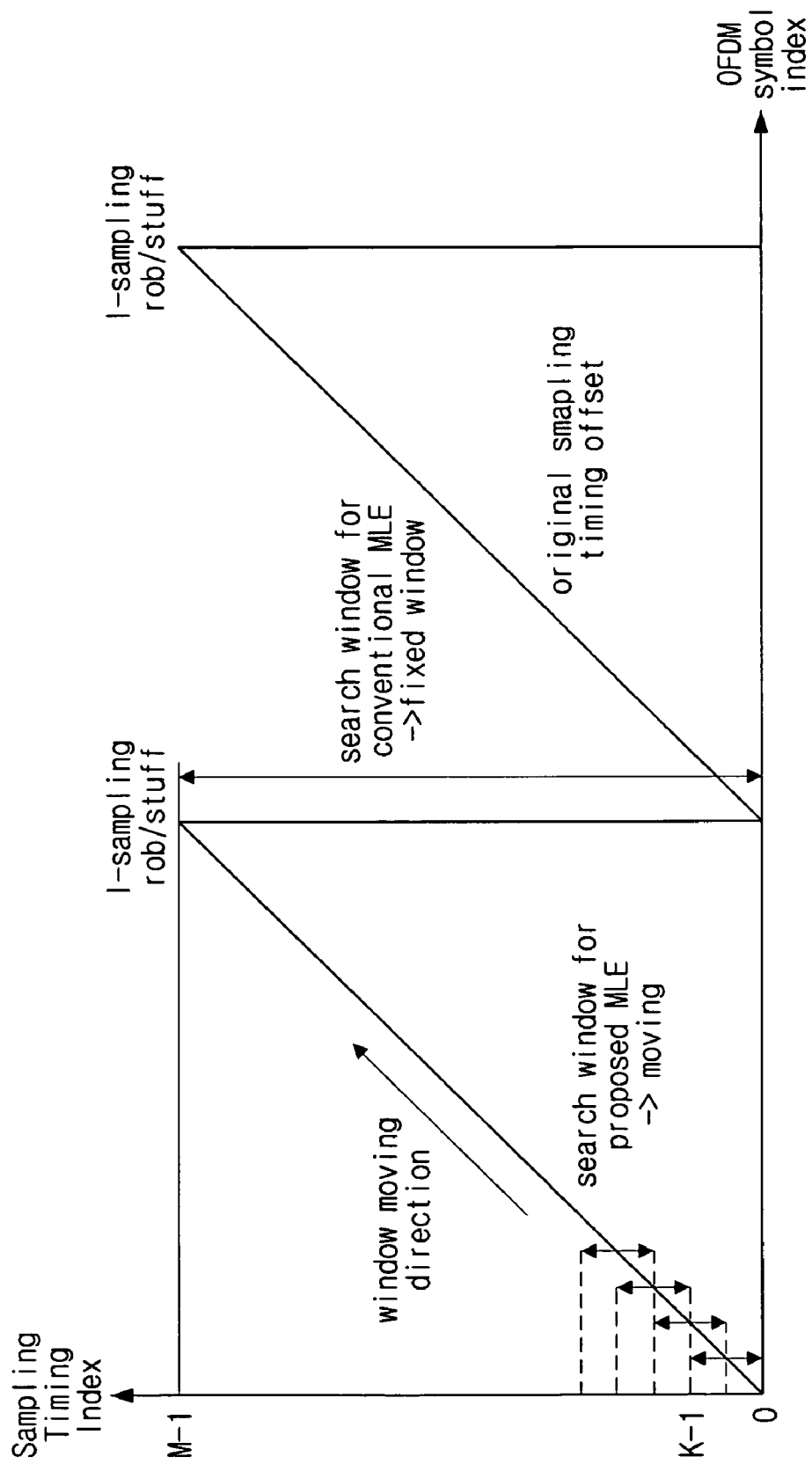
FIG. 5 illustrates how to calculate a search region for the sampling frequency offset tracking for each OFDM symbol in FIG. 4A.

FIG. 5 is a graph illustrating how to calculate the sampling frequency offset estimation search region applied for each OFDM symbol in FIG. 4A.

Referring to FIG. 5, the start point of the MLE search region increases along the OFDM symbol index, but the size of the estimation search range is fixed to K. In FIG. 5, the start point of the MLE search region of the OFDM symbol is the value obtained by subtracting a certain value from the end point of the search region of the previous OFDM symbol as expressed in Equation 3, rather than merely the end point of the search region of the previous OFDM symbol.

That is, the MLE is conducted in the search region smaller than [0, M−1] for each OFDM symbol, whereas the conventional method carries out the MLE in the search region [0, M−1] for each OFDM symbol.

A complex multiplication in the MLE is $2MN_P$, but is $KN_P$ in the exemplary embodiment of the present invention. Herein, M denotes the MLE resolution, and $N_P$ denotes the number of pilot subcarriers. Thus, the calculation overhead in the MLE can be reduced and the sampling frequency offset can be accurately tracked by performing the MLE in the search range K smaller than the MLE resolution M.

Next, the sampling frequency offset is tracked by calculating a maximum correlation between the reference pilot subcarriers and the received pilot subcarriers within the calculated MLE search region (S919).

The sampling frequency offset can be tracked as shown in FIG. 4B according to an exemplary embodiment of the present invention. As explained in FIG. 4A, a determination is made whether a carrier frequency offset (CFO) is positive or not (S950). Depending on whether the CFO is positive or not, correlations between the reference pilot subcarriers and the received pilot subcarriers are calculated when the sampling frequency offset is tracked using the MLE.

The CFO is positive when the sampling time of the receiver is later than the sampling time of the transmitter. In this situation, operations S951 through S956 are carried out.

When the search region of the MLE is K, the MLE calculates correlation by a unit of dividing 1 by the MLE resolution M in the estimation search region ranging from 0 to K−1 (S951, S952, and S953).

Next, a determination is made whether the sampling timing having the maximum correlation is M−1 (S954). When the sampling timing is M−1, the sampling timing corresponds to the MLE resolution. This case indicates the one-sample difference due to the sampling frequency offset. Thus, the phase change due to the sampling frequency offset is compensated in the time domain by robbing one sample (S957).

By contrast, when the sampling timing is not M−1, the sampling timing does not correspond to the MLE resolution. Since this case indicates none of one-sample difference due to the sampling frequency offset, the MLE is conducted on the next OFDM symbol. By setting the end point of the MLE search region of the previous OFDM symbol as the start point of the MLE search region of the next OFDM symbol, the MLE is conducted within the K search region (S955 and S956).

Next, a determination is made whether the OFDM symbol which has passed through the MLE is the last OFDM symbol (S958). When the OFDM symbol is not the last, operations S954 through S958 are repeated. When the OFDM symbol is the last symbol, the sampling frequency offset tracking operation is ended.

Meanwhile, the negative CFO implies that the sampling time of the receiver is earlier than the sampling time of the transmitter. In this situation, operations S991 through S996 are performed. During these operations, the sampling frequency offset tracking operations are the same as in the case when the CFO is positive. The only difference lies in that the MLE direction differs.

Figure 6A:
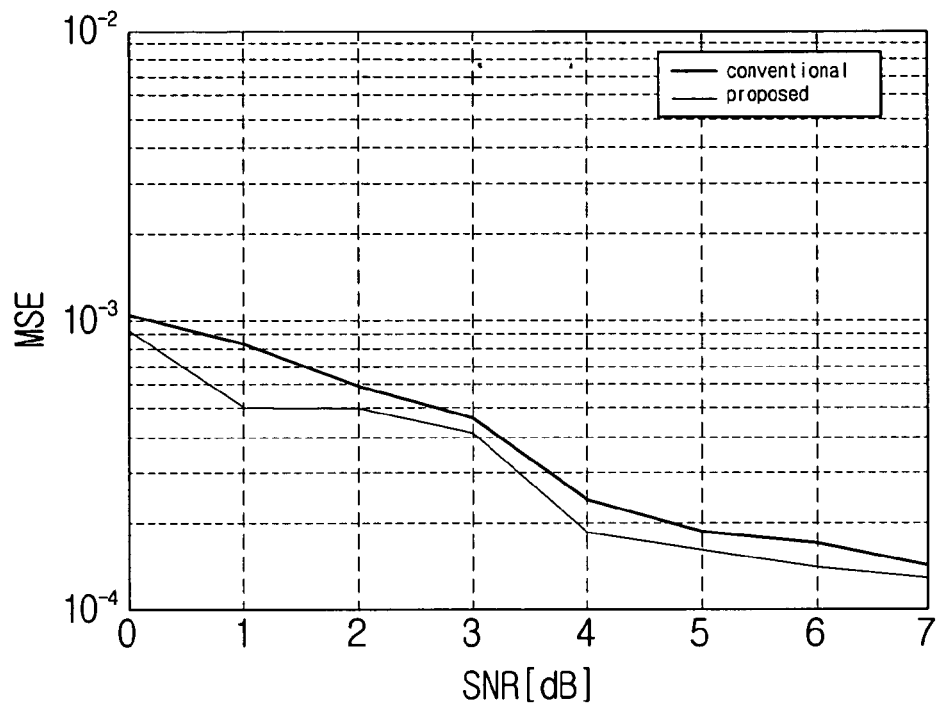
FIGS. 6A and 6B are graphs showing simulation results for comparing performance between the sampling frequency offset tracking method of the present invention and the conventional method.
Figure 6B:
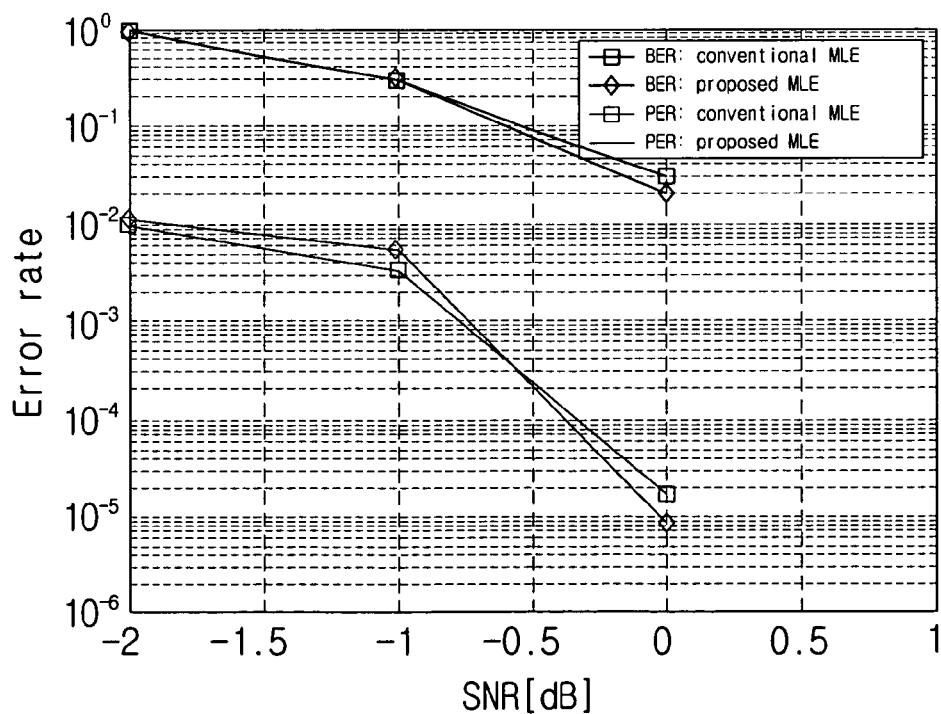

FIGS. 6A and 6B are graphs for showing simulation results of comparing performance between the sampling frequency offset tracking method according to an exemplary embodiment of the present invention and the conventional method.

Particularly, FIG. 6A shows a mean square error (MSE) in cases that the sampling frequency offset is applied according to an exemplary embodiment of the present invention and the conventional method, respectively. As shown in FIG. 6A, the sampling frequency offset of the exemplary embodiment of the present invention further reduces the MSE, comparing with the conventional method.

FIG. 6B shows a bit error rate (BER) and a packet error rate (PER) in cases that the sampling frequency offset is applied according to an exemplary embodiment of the present invention and the conventional method, respectively. As shown in FIG. 6B, the sampling frequency offset of the exemplary embodiment of the present invention further lowers the BER and PER, comparing with the conventional method.

In FIGS. 6A and 6B, the performance of the sampling frequency offset is simulated under conditions that the sampling rate is 528 MHz and the data rate is 53.3 Mbps in the UWB MBOA. The MSE, the PER, and the BER are measured in an environment where the OFDM symbol size is 165, the useful data size is 128, and zero-prefix and guard-interval is 37 when the number of pilots subcarriers is 12 and the payload size is 1024 bytes. In addition, the sampling frequency offset is set to 0~40 ppm and the multipath channel method CM1 is used.

As set forth in the foregoing, the search region of the MLE is reduced by use of the features that the sign of the estimated carrier frequency offset and the maximum phase change are restricted. Therefore, the sampling frequency offset can be easily tracked and the estimation error can be reduced.

Furthermore, it is possible to lower the complexity of the complex multiplier used in the MLE and to reduce the driving power.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An orthogonal frequency division multiplexing (OFDM) system comprising:
   an oscillator which generates a carrier frequency and a sampling frequency;
   a converter which samples a received signal with the generated sampling frequency;
   a frequency offset estimator which estimates a carrier frequency offset using at least one pilot subcarrier of the received signal;
   a fast Fourier transformer (FFT) which transforms the sampled received signal into a frequency domain; and
   an offset tracker which tracks a sampling frequency offset by calculating at least one of a range and a size of a maximum likelihood estimation (MLE) search region for each OFDM symbol based on a sign of the estimated carrier frequency offset, a maximum sampling frequency offset of the OFDM system, and a resolution of MLE, and performs the MLE within the range of the MLE search region which is calculated for each OFDM symbol.

2. The OFDM system of claim 1, wherein the offset tracker comprises:
   a determiner which determines a search direction of the MLE according to the sign of the estimated carrier frequency offset;
   a calculator which calculates the size of the MLE search region using the maximum sampling frequency offset of the OFDM system and the resolution of the MLE, and calculates the MLE search region for each OFDM symbol based on the calculated size; and
   a detector which detects the sampling frequency offset by calculating a maximum correlation between the at least one pilot subcarrier of the received signal and at least one predefined reference pilot subcarrier within the MLE search region calculated for each OFDM symbol.

3. The OFDM system of claim 2, wherein, in order to detect the sampling frequency offset, the detector detects, among the at least one pilot subcarrier, a pilot subcarrier which has the maximum correlation with the at least one predefined reference pilot subcarrier.

4. The OFDM system of claim 2, wherein, if the sign of the estimated carrier frequency offset is positive, the at least one pilot subcarrier is received before the at least one predetermined reference pilot subcarrier, and
   wherein, if the sign of the estimated carrier frequency offset is negative, the at least one pilot subcarrier is received after the at least one predetermined reference pilot subcarrier.

5. The OFDM system of claim 2, wherein the range of the MLE search region for each OFDM symbol has a start point which is an end point of an MLE search region of a previous OFDM symbol, and the end point which is a value obtained by adding the calculated size of the MLE search region to the start point.

6. The OFDM system of claim 1, wherein the size of the MLE search region is calculated based on an equation:

$$K = \left(\left[\frac{1}{M}\frac{f_s + \Delta f_s}{N_s \Delta f_s}\right]^{-1}\right) + A,$$

where K denotes the size of the MLE search region, $\Delta f_s$ denotes the maximum sampling frequency offset of the OFDM system, $N_s$ denotes a size of each OFDM symbol, M denotes the resolution of the MLE, $f_s$ denotes the generated sampling frequency, and A denotes a predetermined constant.

7. The OFDM system of claim 1, further comprising a phase compensator which compensates a phase distortion which is changed due to the tracked sampling frequency offset.

8. The OFDM system of claim 1, further comprising a rob and stuff section which robs or stuffs one sample from or to a location shifted by one sample which is detected based on the tracked sampling frequency offset.

9. An orthogonal frequency division multiplexing (OFDM) system comprising:
   an oscillator which generates a carrier frequency and a sampling frequency;
   a converter which samples a received signal with the generated sampling frequency;
   a frequency offset estimator which estimates a carrier frequency offset using at least one pilot subcarrier of the received signal;
   a fast Fourier transformer (FFT) which transforms the sampled received signal into a frequency domain; and
   an offset tracker which tracks a sampling frequency offset by calculating correlations between at least one of a reference pilot subcarrier predefined according to a resolution of maximum likelihood estimation (MLE) and the at least one pilot subcarrier of the received signal,
   wherein the calculating of the correlations is performed in a search direction of the MLE determined according to a sign of the estimated carrier frequency offset.

10. A sampling frequency offset tracking method in an orthogonal frequency division multiplexing (OFDM) system, the sampling frequency offset tracking method comprising:
    determining a search direction of maximum likelihood estimation (MLE) using a carrier frequency offset which is estimated using at least one pilot subcarrier of a received signal;
    calculating a size of an MLE search region using a maximum sampling frequency offset of the OFDM system and a resolution of the MLE;
    calculating a range of the MLE search region for each OFDM symbol based on the calculated size of the MLE search region; and
    tracking a sampling frequency offset by calculating a maximum correlation between the at least one pilot subcarrier of the received signal and at least one predefined reference pilot subcarrier within the MLE search region calculated for each OFDM symbol.

11. The sampling frequency offset tracking method of claim 10, wherein the calculating of the maximum correlation comprises detecting, among the at least one pilot subcarrier, a pilot subcarrier which has the maximum correlation with the at least one predefined reference pilot subcarrier.

12. The sampling frequency offset tracking method of claim 10, the determining of the search direction of the MLE is performed according to a sign of the carrier frequency offset.

13. The sampling frequency offset tracking method of claim 12, wherein, if the sign of the estimated carrier frequency offset is positive, the at least one pilot subcarrier is received before the at least one predetermined reference pilot subcarrier, and
    wherein, if the sign of the estimated carrier frequency offset is negative, the at least one pilot subcarrier is received after the at least one predetermined reference pilot subcarrier.

14. The sampling frequency offset tracking method of claim 10, wherein the size of the MLE search region is calculated based on an equation:

$$K = \left(\left[\frac{1}{M}\frac{f_s + \Delta f_s}{N_s \Delta f_s}\right]^{-1}\right) + A$$

where K denotes the size of the MLE search region, $\Delta f_s$ denotes the maximum sampling frequency offset of the OFDM system, $N_s$ denotes a size of each OFDM symbol, M denotes the resolution of the MLE, $f_s$ denotes a generated sampling frequency, and A denotes a predetermined constant.

15. The sampling frequency offset tracking method of claim 10, wherein the range of the MLE search region for each OFDM symbol has a start point which is an end point of an MLE search region of a previous OFDM symbol, and the end point which is a value obtained by adding the calculated size of the MLE search region to the start point.

* * * * *